(12) United States Patent
Pullini et al.

(10) Patent No.: US 7,451,641 B2
(45) Date of Patent: Nov. 18, 2008

(54) MAGNETIC TRANSDUCTION SENSOR DEVICE, MANUFACTURING PROCESS AND DETECTION PROCESS THEREFROM

(75) Inventors: Daniele Pullini, Orbassano (IT); Piero Perlo, Sommariva Bosco (IT)

(73) Assignee: C.R.F. Società Consortile per Azioni, Orbassano (Turin) (IT)

(*) Notice: Subject to any disclaimer, the term of this patent is extended or adjusted under 35 U.S.C. 154(b) by 202 days.

(21) Appl. No.: 10/573,919

(22) PCT Filed: Sep. 29, 2004

(86) PCT No.: PCT/IB2004/003173

§ 371 (c)(1),
(2), (4) Date: Mar. 30, 2006

(87) PCT Pub. No.: WO2005/033644

PCT Pub. Date: Apr. 14, 2005

(65) Prior Publication Data

US 2007/0035892 A1 Feb. 15, 2007

(30) Foreign Application Priority Data

Oct. 3, 2003 (IT) ............ TO2003A0774
Oct. 3, 2003 (IT) ............ TO2003A0775

(51) Int. Cl.
*E01C 23/00* (2006.01)
*G01B 7/16* (2006.01)

(52) U.S. Cl. .......... 73/146; 73/779

(58) Field of Classification Search .......... 73/779, 73/146
See application file for complete search history.

(56) References Cited

U.S. PATENT DOCUMENTS 5,631,096 A * 5/1997 Nakajima et al. ........ 428/819
5,654,854 A * 8/1997 Mallary ................ 360/327.3
5,742,162 A * 4/1998 Nepela et al. ........... 324/252

(Continued)

FOREIGN PATENT DOCUMENTS

EP 0 650 139 4/1995
JP 63247631 10/1988

OTHER PUBLICATIONS

Olson, E.R., et al, "Integrating Giant Magnetoresistive Current and Thermal Sensors in Power Electronic Modules," IEEE, US, vol. 1, Feb. 9, 2003, pp. 773-777, XP002334290 New York.
International Search Report.

*Primary Examiner*—Max Noori
(74) *Attorney, Agent, or Firm*—Nixon & Vanderhye P.C.

(57) ABSTRACT

A magnetic pressure sensor device comprises at least one magnetic layer able to vary a magnetisation associated thereto in response to a pressure (P) exerted thereon. The device comprises a plurality of layers arranged in a stack, the magnetic layer able to vary a magnetisation associated thereto in response to a pressure (P) comprising a free magnetic layer, able to be associated to a temporary magnetisation (MT), the free magnetic layer belonging to said plurality of layers, which further comprises at least a spacer layer and a permanent magnetic layer associated to a permanent magnetisation (MP). The sensor device further comprises a compressible layer and a layer with high magnetic coercivity associated to the plurality of layers.

50 Claims, 6 Drawing Sheets

U.S. PATENT DOCUMENTS

| | | | |
|---|---|---|---|
| 5,776,537 A * | 7/1998 | Ryan et al. | 427/8 |
| 5,889,740 A * | 3/1999 | Nakayama et al. | 428/819.3 |
| 5,962,154 A * | 10/1999 | Hashimoto et al. | 428/821 |
| 6,180,268 B1 * | 1/2001 | Tamanoi et al. | 428/818 |
| 6,476,113 B1 | 11/2002 | Hiles | |
| 6,507,187 B1 | 1/2003 | Olivas et al. | |
| 6,657,890 B1 * | 12/2003 | Bloomquist | 365/173 |
| 6,735,112 B2 * | 5/2004 | Zhu et al. | 365/158 |
| 6,754,020 B1 * | 6/2004 | Hikosaka et al. | 360/59 |
| 6,920,064 B2 * | 7/2005 | Zhu et al. | 365/171 |
| 7,177,122 B2 * | 2/2007 | Hou et al. | 360/324.12 |
| 7,200,035 B2 * | 4/2007 | Zhu et al. | 365/158 |

* cited by examiner

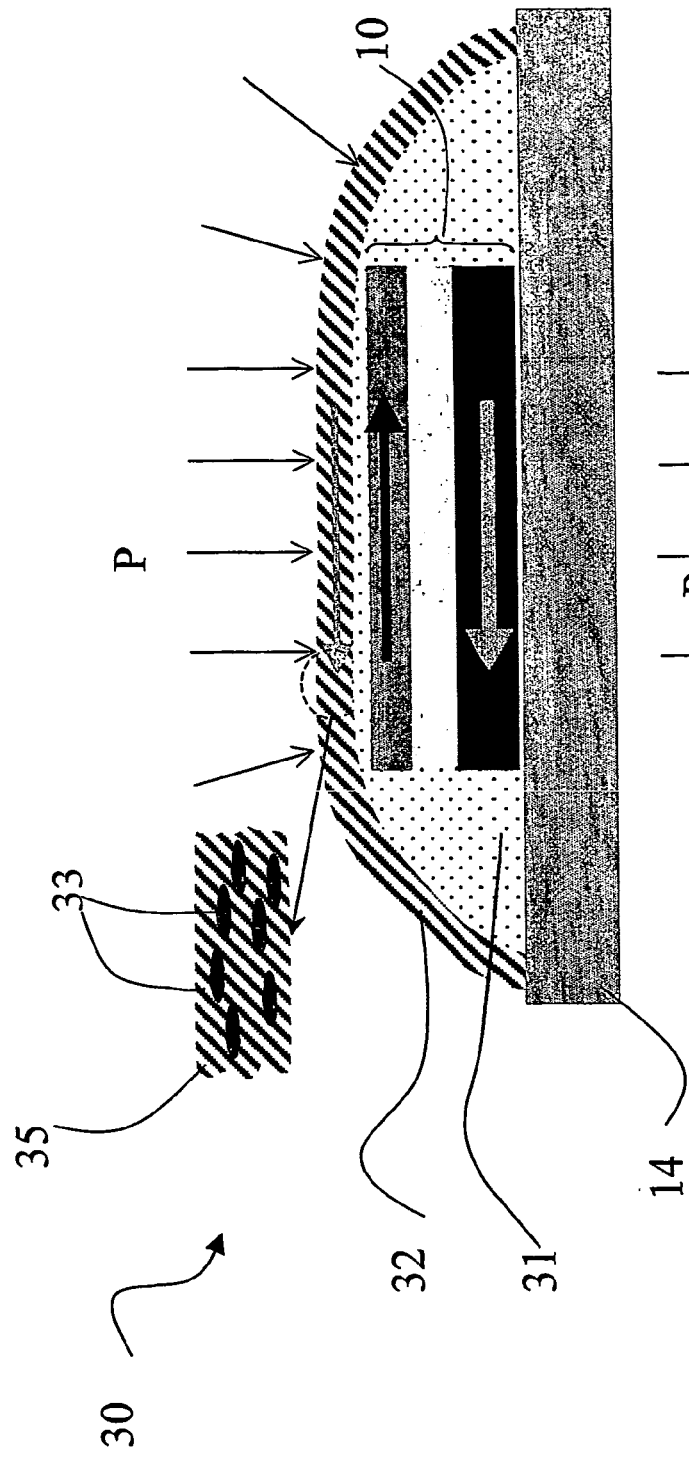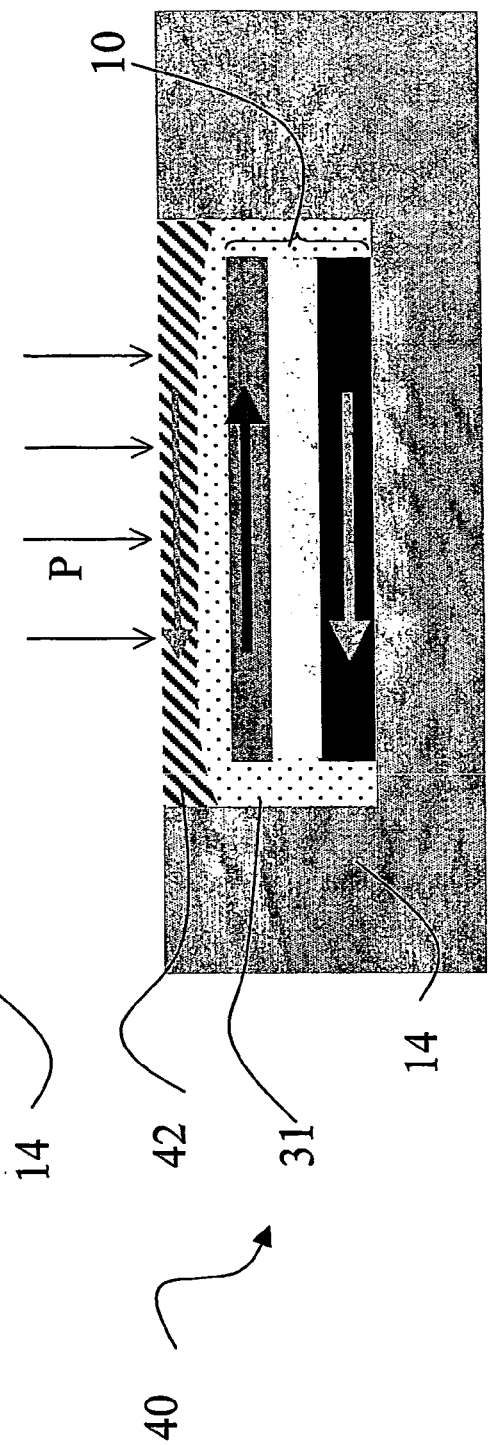
Fig. 3
Fig. 4

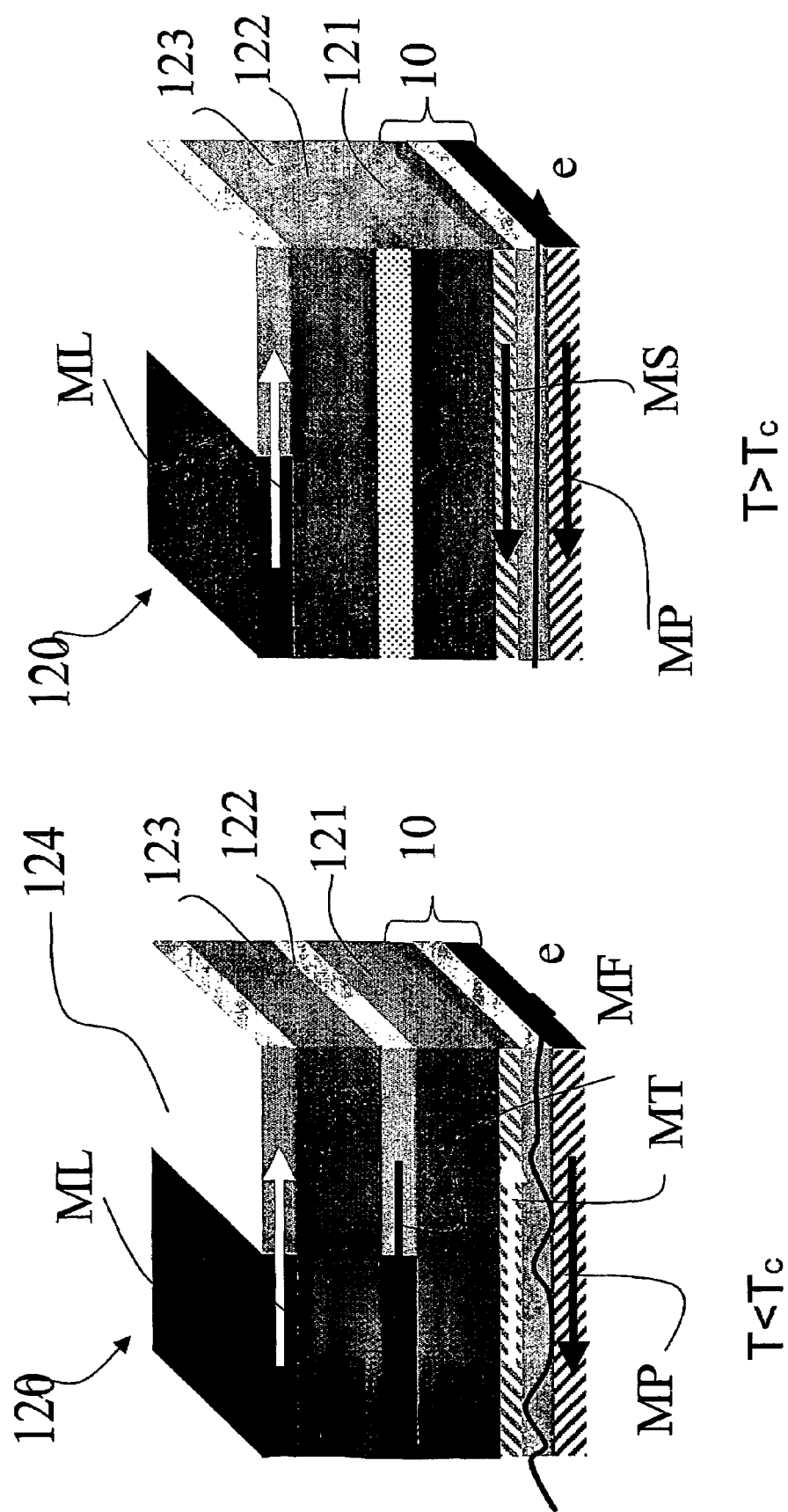
Fig. 7A  T<T_c
Fig. 7B  T>T_c

MAGNETIC TRANSDUCTION SENSOR DEVICE, MANUFACTURING PROCESS AND DETECTION PROCESS THEREFROM

This application is the US national phase of international application PCT/IB2004/003173 filed 29 Sep. 2004 which designated the U.S. and claims benefit of IT TO2003A000774 and IT TO2003A000775, dated 3 Oct. 2003, respectively, the entire content of which is hereby incorporated by reference.

The present invention relates to a magnetic pressure sensor device, of the type comprising at least one magnetic layer able to vary a magnetisation associated thereto in response to a pressure exerted on said same magnetic layer.

In the field of pressure sensors, the most widely used devices for applications requiring on site measurements by means of sensors employing thin film technology, are so-called 'strain gauge' devices, which substantially use platelets whereon are deposited bridges formed by piezoelectric material. Such sensors are analogue and occasionally can be not suitable for detecting pressure thresholds with sufficient sensitivity and switching speed.

Also known are thin film magnetic sensors that exploit the magnetostrictive properties of magnetic layers. However, such layers are difficult to construct, are fragile, and have limited sensitivity.

In the field of temperature sensors, the use is known of magnetic materials provided with a high Curie temperature, i.e. the temperature above which a ferromagnetic material is transformed into a paramagnetic material, or, in other words, loses its magnetisation.

It is possible to exploit the transition to the Curie temperature, for example inserting a magnetic material in a magnetic circuit and observing the variation of an electrical current applied when the temperature threshold defined by the Curie temperature is crossed. A sensor of this kind is known for instance from British patent GB 1526726.

However, it is desirable to be able to integrate such a type of temperature sensor to current miniaturisation levels, exploiting techniques for the thin film plating of magnetic materials.

U.S. Pat. No. 3,848,466 discloses depositing a thin film of magnetic material with sufficiently high magnetic permeability and Curie temperature, and detect with a sensing coil the impedance variations or phase rotations due to the crossing of the Curie temperature.

Such a sensor can be miniaturised to a limited extent, due to the large size of the sensing coil.

The object of the present invention is to provide a solution able to fabricate a magnetic transduction sensor device with thin film technology that can be easily obtained and is highly rugged and sensitive.

According to the present invention, said object is achieved thanks to a sensor device and to a corresponding manufacturing process, as well as a corresponding sensing system having the characteristics specifically set out in the claims that follow.

The invention shall now be described with reference to the accompanying drawings, provided purely by way of non limiting example, in which:

FIG. 3 is a schematic diagram of a first variant to the magnetic transduction pressure sensor device according to the invention;

FIG. 4 is a schematic diagram of a second variant to the pressure sensor device according to the invention;

FIGS. 7A and 7B show, in diagram form, two different operating states of a magnetic transduction temperature sensor device according to the invention;

The proposed magnetic transduction sensor device exploits, for the measurement, so-called 'spin valve' magnetic devices. A spin valve is a device generally constituted by a succession of layers of different materials.

Figure 1:
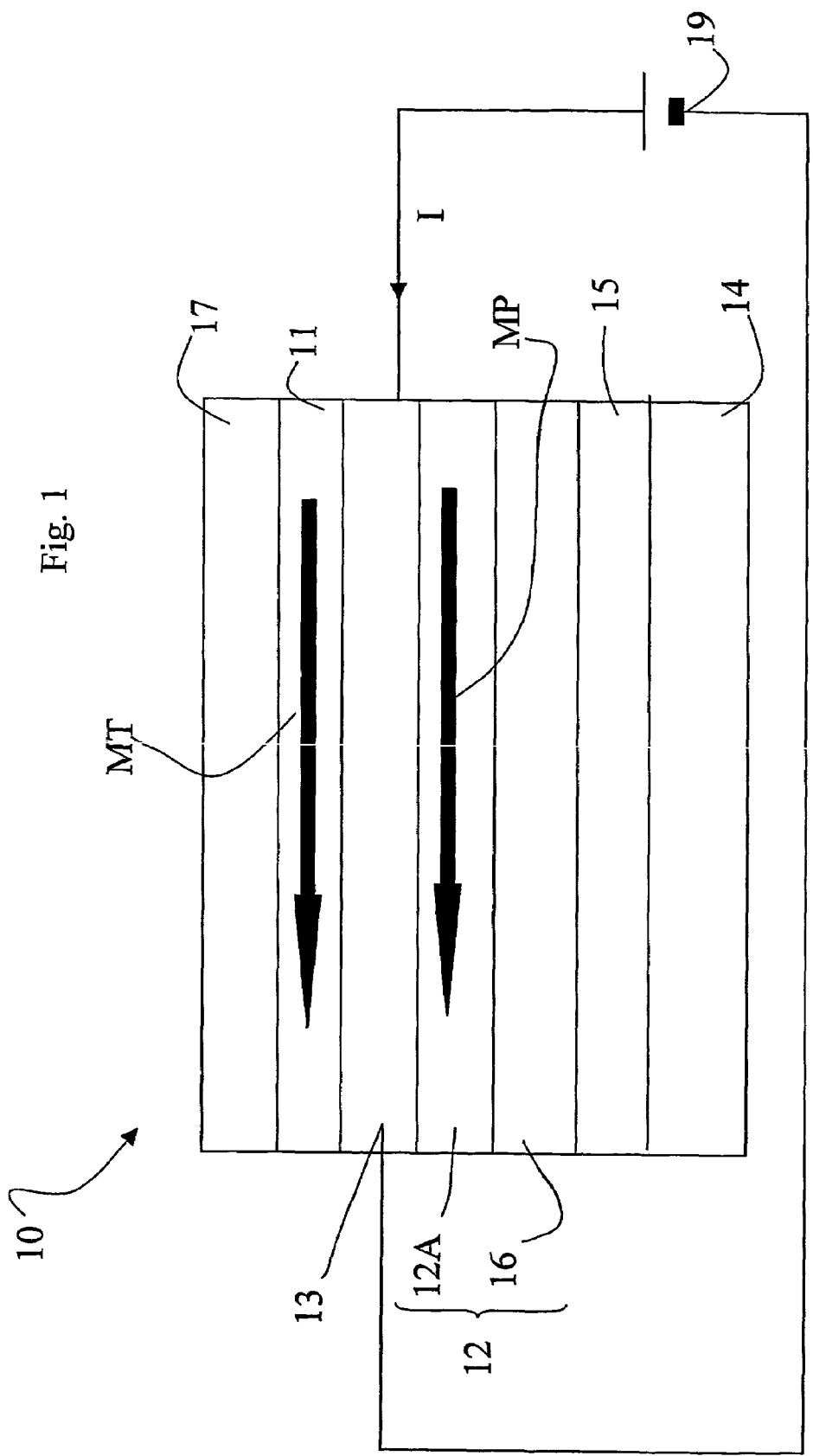
FIG. 1 shows a schematic diagram of a spin valve magnetic device.

The structure of a spin valve magnetic device 10 is shown schematically in FIG. 1. Said spin valve 10 comprises a plurality of stacked layers or different materials. This plurality of layers comprises, in particular, a substrate 14, for example a glass substrate, whereon is laid a growth layer 15, also called seed layer, obtained for example with a layer of tantalum, which acts as a seed for the growth of a permanent magnetic layer 12.

In FIG. 1, said permanent magnetic layer 12 is shown comprising two layers, a pinned magnetic layer 12A, also called 'pinned layer' and a pinning antiferromagnetic layer 16, also called 'pinning layer'. The antiferromagnetic layer 16 produces a short radius magnetic field that influences and pins a permanent magnetisation MP of the pinned layer 12A, which can no longer follow an external magnetic field. The set of the layers 12A and 16 behaves in fact as a permanent magnet with high magnetic coercivity and provides a reference field to the spin valve 10.

The permanent magnetic field 12 can alternatively be obtained by the simple deposition of a single hard magnetic layer, for example a layer of cobalt.

The antiferromagnetic layer 16 of the spin valve 10 is obtained, for example, by means of a NiMn alloy. Said antiferromagnetic layer 16 is then coated by a passivating layer 17, also made of tantalum.

Superiorly to the permanent magnetic layer 12 is placed a non ferromagnetic spacer layer 13.

The use is known of a thin layer of copper to obtain said spacer layer 13 if the spin valve 10 is of a GMR (Giant Magneto Resistance) spin valve, or a dielectric layer, for instance an oxide like $Al_2O3$ or SiOx, if the spin valve 10 is a TMR (Tunnel junction Magneto Resistance) spin valve. On the spacer layer 13 is deposited a free magnetic layer 11.

The free magnetic layer 11 is constituted by a soft magnetic material, such as an iron-nickel alloy like permalloy, provided with a temporary, i.e. non permanent, magnetisation MT. Said free magnetic layer 11 serves the purpose of orienting its temporary magnetisation MT following the external magnetic field to be measured.

The spin valve 10 shown in FIG. 1 is of the CIP (current in plane) type, i.e. to the spin valve, by means of a generator 19, is applied a current I that lows in planar fashion in the spacer layer 13 and in the other layers of the spin valve 10. The spaces layer 13 then is the layer that contributes most to determine the electrical resistance of the spin valve 10 in the absence of a magnetic field. It is also possible to have a CPP configuration (Current Perpendicular to Plane), in which the current I is forced to traverse vertically the stacked layers of the spin valve.

In the absence of an external magnetic field, the spin valve shown in FIG. 1 is in ferromagnetic configuration, i.e. the free magnetic layer 11 and the permanent magnetic layer 12 have the same direction of magnetisation. Thus in this case the spin valve has high electrical conductivity, since the path of the electrons inside the device undergoes substantially no scattering.

In the presence of an external magnetic field whose direction is opposite to the reference magnetic field, due to the permanent magnetic field, of the spin valve, the spin valve is in anti-ferromagnetic configuration and it has low electrical conductivity. The path of the electrons in the spacer layer and in the entire spin valve has to be subjected to a considerable scattering phenomenon.

Figure 2:
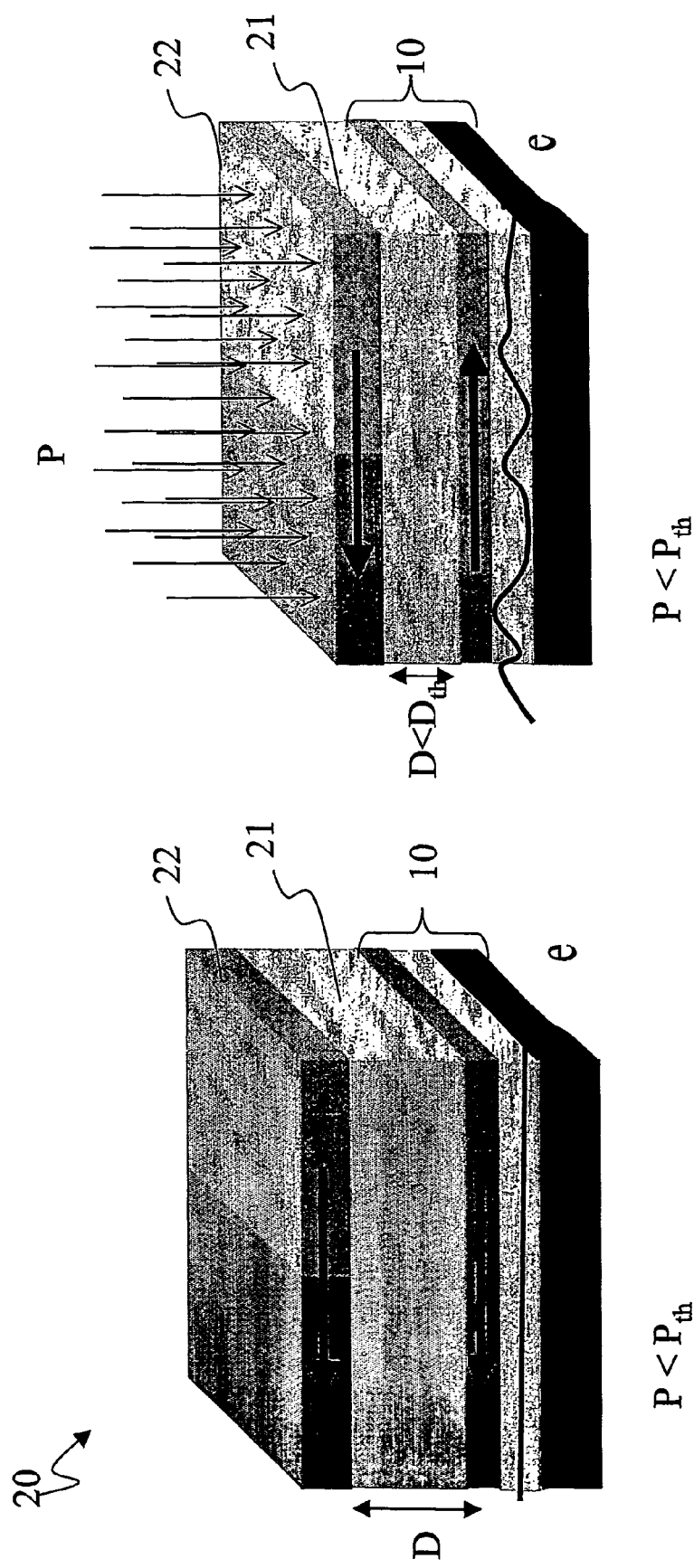
FIGS. 2A and 2B show, in diagram form, two different operating states of a magnetic transduction sensor device according to the invention.

FIG. 2A shows a pressure sensor 20 according to the invention, which is substantially based, as previously mentioned, on the operation of a spin valve, TMR (Tunnel junction Magneto Resistance) or GMR (Giant Magneto Resistance)

More specifically, said pressure sensor 20 provides for depositing, on a spin valve device 10 similar to the one shown in FIG. 1, a compressible layer 21, obtained with a polymer, elastomer or gel, which is compressible by applying a pressure and which behaves in resilient fashion. Said compressible layer 21 is laid over the free magnetic layer 11.

On the compressible layer 21 is then deposited a magnetic layer with high coercivity 22, which behaves likes a permanent magnet and whereto is a associated such as saturation magnetisation as to be able to induce a switch in the magnetisation of said free magnetic layer 11.

For a lower value of the pressure P, exerted perpendicularly on the compressible layer 21, than a threshold pressure $P_{th}$, a thickness D of the compressible layer 21 is greater than a threshold thickness $D_{th}$, so that the magnetic layer with high coercivity 22 is at such a distance from the free magnetic layer 11, that said free magnetic layer 11 can orient itself along a predefined and preferential direction, the so-called axis of easy magnetisation, or 'easy axis', which can be parallel, as shown in FIG. 2A, or anti-parallel relative to the magnetisation MP of the permanent magnetic layer 12.

In the sensor 20, as in the case shown in FIG. 1, an electrical current I is forced along a horizontal direction, along the planes defined by the layers of the sensor 20.

In FIG. 2A, the spin valve 10 is shown in "parallel configuration". This means that the free magnetic layer 11 and the permanent magnetic layer 12 are magnetised in the same direction and sense in the absence of an external magnetic field. In this configuration, the sensor 20 presents a low value of electrical resistance to the current I.

When the pressure P is greater than the threshold pressure Pth, the magnetic layer with high coercivity 22 is at shorter distance than the threshold distance Dth from the free magnetic layer 11 and thus forces its direction of magnetisation to switch. In other words, the free magnetic layer 11 is oriented according to the lines of the field produced by the high coercivity magnetic layer 22; hence, by virtue of the increase in the pressure P, the spin valve 10 switches to anti-parallel configuration, induces a scattering in the path of the electrons, designated by the reference 'e' in FIGS. 2A and 2B, and consequently assumes a high electrical resistance relative to the current I which is forced horizontally in the sensor 20.

Thus a pressure sensor like the one proposed herein is able to signal pressure transitions through a threshold pressure $P_{th}$.

The threshold pressure $P_{th}$ depends on the physical dimensions of the elastic layer, in particular on the thickness D, on the saturation magnetisation value of the high coercivity magnetic layer 22 and on the intrinsic characteristics of the spin valve 10.

The compressible layer 21 can be obtained by means of a porous composite material.

The elastomer compressible layer 21 can be laid by means of a spinning process, appropriately diluting the elastomer similarly to the way a resist is diluted by a solvent which evaporates during the laying, with a casting process, i.e. casting it over the spin valve like a silicon, by evaporation (thermal, electron beam, sputtering, CVD).

The high coercivity magnetic layer 22 can be deposited by thermal, electron beam, sputtering or CVD evaporation, or electrically laid by means of electrochemical cell.

FIG. 3 shows a different embodiment in which a pressure sensor 30 has a compressible layer 31 comprising an elastomer in the form of gel, foam or compressible liquid. The compressible layer 31 is contained within a high coercivity magnetic layer 32 made of composite material 34, in particular an elastic matrix 35, which can be a polymer or an elastic resin, in which are incorporated magnetic particles 33, i.e. particle capable of having a residual magnetisation, with size variable between a millimeter and a nanometer, oriented by means of an external magnetic field during the deposition step, e.g. a process of casting in magnetic field.

The saturation magnetisation of the individual particles 33, their density and dimensions determine the final saturation magnetisation of the permanent magnet.

The magnetic particles 33 can be obtained separately or on site inside the polymer that constitutes the elastic matrix 35 of the composite material 34.

FIG. 4 shows a pressure sensor device 40, variant to the embodiment of FIG. 3, where the substrate 14 is etched and the spin valve 10 is deposited on the bottom of a hole 36 thereby obtained.

Similarly to the embodiment of FIG. 3A, the compressible layer 31, subsequently deposited, incorporates the spin valve 10 and a layer with high magnetic coercivity 42 is deposited over to reach the height of the surface of the substrate 14.

Figure 5:
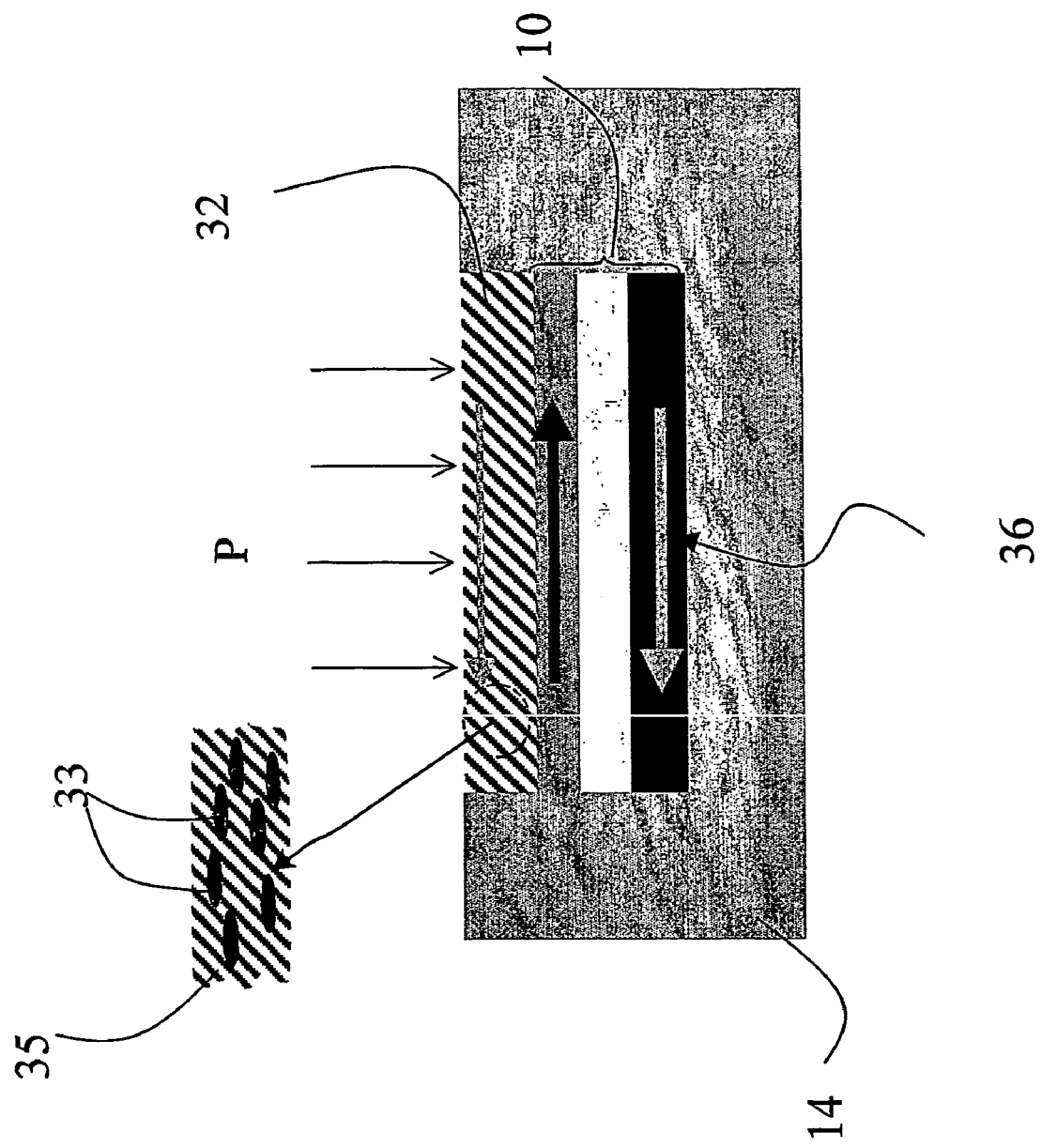
FIG. 5 is a schematic diagram of a third variant to the magnetic transduction pressure sensor device according to the invention.

FIG. 5 shows an additional embodiment 50 of the proposed pressure sensor device, which substantially corresponds to the one shown with reference to FIG. 4, with the exception of the elimination of the compressible layer 31. On the spin valve 10 is directly laid the high coercivity layer 32, comprising magnetic particles 33 in an elastic matrix 35, as in the case shown in FIG. 3. In other words, the high coercivity layer 32 performs, at the same time, the function of compressible layer under the action of the pressure P. The density of the particles 33 in the elastic matrix 35 changes with external pressure P and consequently varies the intensity of the generated magnetic field. Moreover, when the high coercivity layer 32 is compressed downwards, the force lines generated by the magnetic particles 33 are also lowered and are able to cause the free magnetic layer 11 to switch.

The proposed pressure sensor can be used in association with a system for monitoring and restoring the pressure of a tyre, which substantially provides for positioning one or more sensors on the inner surface of the tyre, or on the surface of the rim of the wheel that faces said tyre, in particular inside the inner tube and for restoring the pressure by means of a magnetic micro-pump that draws air from the exterior and blows it into the inner tube.

Figure 6:
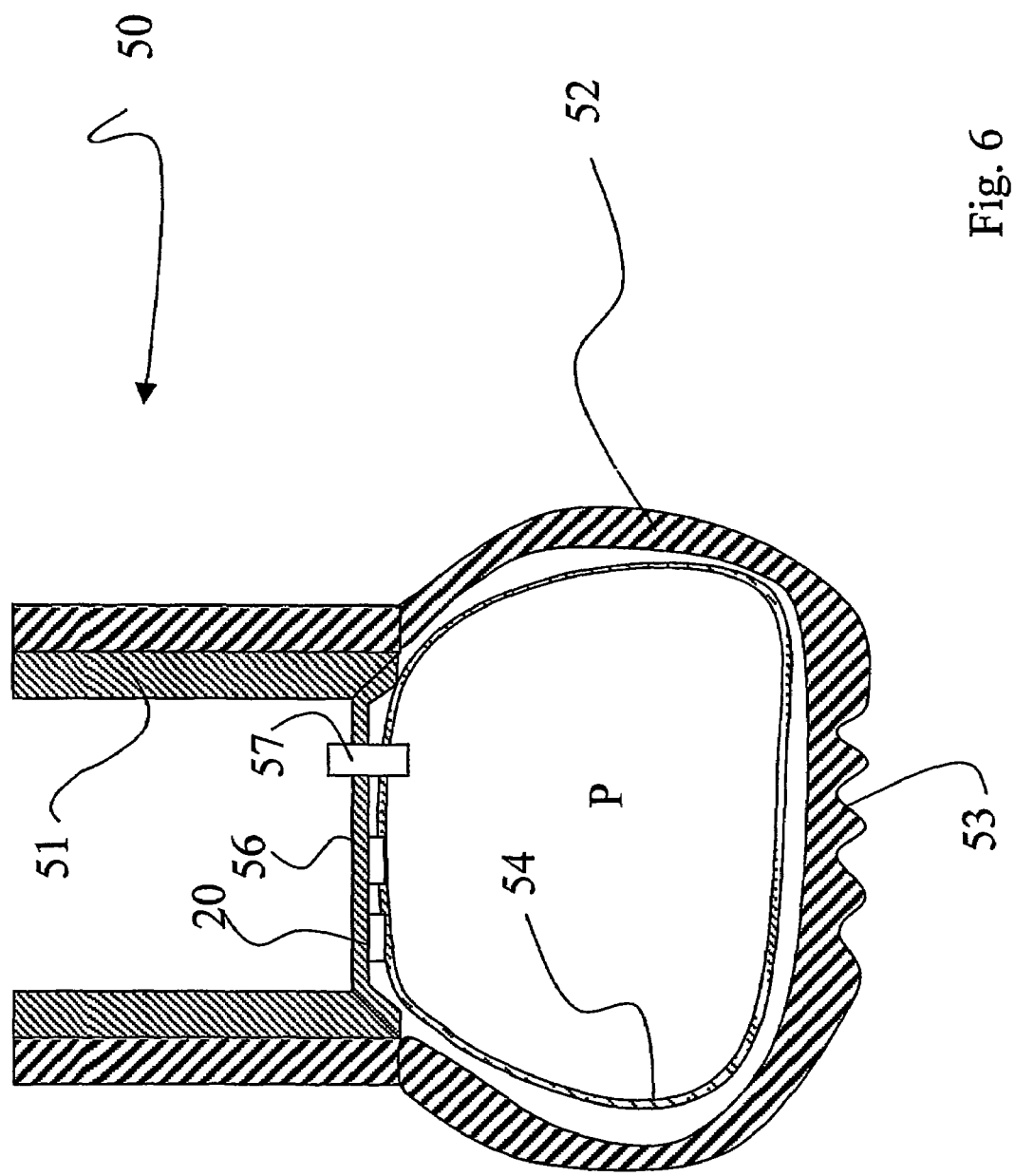
FIG. 6 shows an application example of the magnetic transduction pressure sensor device according to the invention.

FIG. 6 therefore shows a wheel, globally designated by the reference number 50, which comprises a rim 51 and a tyre 52 provided with a tread 53 and an inner tube 54.

A magnetic pressure sensor 20 is positioned on the inner surface of the tyre 52 and measures the pressure P inside the inner tube 54, providing an electrical signal to a control unit 56 positioned in the tyre 52 itself. Said control unit 56 is preferably configured to supply its own power by converting the vibrational energy due to the motion of the wheel 52 into electrical energy. Said unit 56 is also connected to a magnetic micro-pump 57, positioned in sealed pass-through fashion between the inner tube 54, the tyre 52, the rim 51 and the exterior environment.

The operation of the proposed system is as follows: when the magnetic pressure sensor 20 measures a value of pressure P inside the tyre 52, lower than a threshold value $P_{th}$, the unit 56 commands the operation of the magnetic micro-pump 57, which draws air from the exterior and blows it into the inner tube 54.

FIG. 7A shows a temperature sensor 20 according to the invention, which is also substantially based, as previously mentioned, on the operation of a spin valve, of the TMR (Tunnel junction Magneto Resistance) or GMR (Giant Magneto Resistance) type.

More specifically, said temperature sensor 120 comprises, deposited onto a spin valve device 10 similar to the one shown in FIG. 1, a second spacer layer 121, made of dielectric, or ceramic, or polymeric material, or of another material able to separate the spin valve 10 from the subsequent layers. Said second spacer layer 121, therefore, has no ferromagnetic properties and is substantially insulating.

Over the second spacer layer 121 is deposited a layer with low Curie temperature 122, which has a high magnetic coercivity, i.e. it is a permanent magnet whereto is associated a magnetisation MF when an ambient temperature T is lower than a Curie temperature $T_c$.

The Curie temperature $T_c$ in the present description is defined as 'low' with respect to the Curie temperatures of most ferromagnetic materials, which assume values of around 600 K. Hence, a low Curie temperature lies in a temperature range that indicatively varies between ambient temperature and 400 K. By way of example, the low Curie temperature layer 122 could be made of nickel ($T_c$=378K). It is clear that the type of application of the sensor determines the Curie temperature $T_c$ and consequently the selected material.

Said low Curie temperature layer 122 can be deposited by thermal evaporation, electron beam, sputtering, by electric plating in Galvanic cell, casting, spinning.

The low Curie temperature layer 122 can be obtained by depositing in a magnetic field or applying a subsequent step of thermal annealing in a magnetic field.

Said low Curie temperature layer 122 can also be conveniently obtained from a material with composite structure, in particular obtained by dispersing particles in a polymeric, resin, ceramic or dielectric matrix. The size of these particle can vary within a range between one millimeter and one nanometer in diameter. The adoption of such composite structures allows conveniently to regulate the Curie temperature $T_c$ according to the application, varying the composition of the structure.

These particles can be obtained separately or on site at the matrix. The particles can be magnetised while mixing in the matrix or subsequently.

Over said low Curie temperature layer 122 is deposited a third spacer layer 123 similar to the second layer 121 and able to separate the low Curie temperature layer 122 from a subsequent magnetic layer with low saturation magnetization 124.

The magnetic layer with low saturation magnetisation 124 is a permanent magnet and can be laid by thermal evaporation, electron beam, sputtering, by electric plating in Galvanic cell, casting, spinning.

Said layer with low saturation magnetisation 124 can be obtained by laying in a magnetic field or by subsequent thermal annealing in a magnetic field.

The low saturation magnetisation layer 124, similar to the low Curie temperature layer, can be obtained from a composite material, and in particular a dispersion of particles in a polymeric, resin, ceramic or dielectric matrix. Naturally, in this case said particles are permanent magnets with low saturation magnetisation.

The function of said layer with low saturation magnetisation 124 is to restore the magnetisation of the low Curie temperature layer 122, when the temperature drops below the Curie temperature $T_c$ and the layer 122 loses its magnetisation MF. The layer with low saturation magnetization 124 is located, in particular because of the interposition of the second spacer layer 121 and of the third spacer layer 123, at such a distant as to be unable to influence the temporary magnetisation MT of the free magnetic layer 11 of the spin valve 10.

The temperature sensor device 120 operates in the following manner.

When, as in the configuration of FIG. 7A, the temperature T is lower than the Curie temperature $T_c$ of the low Curie temperature layer 122, said layer 122 is able to magnetise the free magnetic layer 11 of the underlying spin valve 10. The spin valve 10, therefore, is in anti-parallel configuration, induces a scattering in the path of the electrons, designated by the reference 'e' in FIGS. 7A and 7B, and consequently assumes a high electric resistance with respect to the current I which is forced horizontally in the sensor 120.

When the temperature T exceeds the threshold of the Curie temperature $T_c$, as shown in FIG. 7B, the low Curie temperature layer 122 is demagnetised and consequently is no longer able to magnetise the free magnetic layer 11, which will be free to assume a spontaneous magnetisation MS along the opposite direction, corresponding to the so-called preferential magnetisation axis. In this configuration the underlying spin valve has low scattering at the path 'e' of the electrons and low electrical resistivity.

The function of said layer with low saturation magnetisation 124, as mentioned above, is to re-magnetise the low Curie temperature layer 122, when temperature again drops below its Curie temperature $T_c$.

The solution described above allows to achieve considerable advantages with respect to prior art solutions.

The sensor device according to the invention can advantageously be obtained with consolidated thin film technologies for the production of spin valve devices, which allow to obtain reliable, highly sensitive devices.

In particular, advantageously, the proposed magnetic pressure sensor device is particularly suited to obtain pressure 'switches' with high sensitivity and switching rapidity.

The temperature sensor device according to the invention can advantageously be obtained with consolidated thin film technologies for the production of spin valve devices, which allow to obtain miniaturised, reliable, highly sensitive devices.

In particular, advantageously, the proposed magnetic temperature sensor device is particularly suited to obtain temperature 'switches' with high sensitivity and switching rapidity.

Naturally, without altering the principle of the invention, the construction details and the embodiments may vary widely from what is described and illustrated purely by way of example herein, without thereby departing from the scope of the present invention.

A pressure sensor device of the type described herein can be used in a variety of applications requiring the measuring of a pressure.

The pressure monitoring and restoring system which employs the proposed sensor device can also comprise tyre wear sensors or temperature sensors and additional actuators or valves. The self-powering of the control unit and of the sensor through the motion of the wheel can also be obtained by generating electrical current induced in inductive fashion in coils of conducting material inserted in the tyre, coupled with magnets fastened on the body of the motor vehicle or vice versa.

However, clearly the proposed device can be applied in all pressure measurements compatible with a magnetic pressure sensor device of the type comprising at least one magnetic layer able to vary a magnetisation associated thereto in response to a pressure exerted thereon, and further comprising a plurality of stacked layers, said magnetic layer able to vary a magnetisation associated thereto in response to a pressure comprising a free magnetic layer, able to be associated to a temporary magnetisation, belonging to said plurality of layers, said stack further comprising at least one spacer layer and a permanent magnetic layer associated to a permanent magnetisation, said sensor device further comprising a compressible layer and a layer with high magnetic coercivity, associated to said plurality of layers.

A temperature sensor device of the type described herein can be used in a variety of applications requiring the measuring of a temperature.

In particular, the proposed device can be used to measure the temperature of a tyre. In this case the temperature sensor can be comprised in an appropriate measuring unit, comprising also tyre consumption sensors and/or pressure sensors and, possibly, actuators or valves to restore the temperature of the tyre, said unit being located directly on the tyre and powered autonomously through the conversion of vibrational energy derived from the motion of the tyre.

In a similar case, the temperature sensor should be sensitive to a temperature threshold within the range between 50 and 100° C.

However, clearly the proposed device can be applied in all temperature measurements compatible with a magnetic temperature sensor device like the one described above, in which the means for detecting the magnetisation variation comprise a plurality of stacked layer, which comprises at least one free magnetic state, able to be associated with a temporary magnetisation, and in which a magnetic layer able to vary a magnetisation associated therewith in response to a temperature is associated with said plurality of layers in such a configuration as to influence the temporary magnetisation of the free magnetic layer.

The invention claimed is:

1. A magnetic transduction sensor device, of the type comprising at least one magnetic layer configured to determine a variable magnetisation (MF) in response to the variation of a physical quantity (P, T), wherein said device comprises a plurality of layers arranged in a stack, said magnetic layer configured to determine a variable magnetisation (MF), in response to the variation of a physical quantity (P, T) interacting magnetically through said variable magnetisation (MF) with a free magnetic layer, able to be associated with a temporary magnetisation (MT), said free magnetic layer belonging to said plurality of layers, which further comprises at least one spacer layer (13) and a permanent magnetic layer (12) associated to a permanent magnetisation (MP), wherein said physical quantity (P, T) is a pressure (P) and in that said sensor device further comprises a compressible layer and in that said magnetic layer configured to determine a variable magnetisation (M) in response to the variation of a physical quantity (P, T) comprises a layer with high magnetic coercivity, said compressible layer and layer with high magnetic coercivity being associated with said plurality of layer, and wherein said compressible layer is obtained by and comprises a polymer, elastomer or gel, which is compressible by applying a pressure and which behaves in resilient fashion.

2. Manufacturing process of a pressure sensor device as claimed in claim 1, wherein it provides for depositing said compressible layer by means of a spinning process and/or by means of a casting process and/or by evaporation.

3. Device as claimed in claim 1, wherein said compressible layer is laid onto the free magnetic layer and said layer with high magnetic coercivity is laid onto said compressible layer.

4. Device as claimed in claim 3, wherein said compressible layer has such an uncompressed thickness (D) as to prevent the layer with high magnetic coercivity from switching the temporary magnetisation (MT) associated with said free magnetic layer.

5. Device as claimed in claim 4, wherein said layer with high magnetic coercivity is obtained by means of a composite structure comprising magnetic particles contained in a resilient matrix.

6. Device as claimed in claim 5, wherein said plurality of layers comprises a substrate, in turn comprising a recess into which said sensor device is laid.

7. Device as claimed in claim 5, wherein said layer with high coercivity contains the compressible layer which is in the form of gel or foam or liquid.

8. Device as claimed in claim 5, wherein said layer with high magnetic coercivity comprising magnetic particles contained in a resilient matrix is able to perform also the function of compressible layer.

9. Device as claimed in claim 1, wherein the compressible layer is obtained by means of a porous composite material.

10. Device as claimed in claim 1, wherein said plurality of layers arranged in a stack configures a spin valve magnetic device.

11. Device as claimed in claim 1, wherein it is associated to a pressure monitoring and/or restoring system of a tyre positioned on a wheel, said system comprising a control unit and one or more actuators for blowing air into the tyre.

12. Manufacturing process as claimed in claim 2, wherein it provides for depositing said magnetic layer with high coercivity by means of evaporation and/or electroplating techniques with electrochemical cell.

13. Detection process of a physical quantity by magnetic transduction, employing the device as claimed in claim 1.

14. Detection process as claimed in claim 13, wherein said physical quantity is a pressure (P) and in that the method comprises the following operations:
realizing said compressible layer with an uncompressed thickness (D) exceeding a threshold thickness (Dth) below which the layer with high coercivity influences the magnetisation (MT) of the free magnetic layer (11);
forcing an electrical current (I) in said sensor device;
measuring the value of the electrical resistance of said sensor device as a function of the values assumed by the pressure (P).

15. Process as claimed in claim 14, wherein it associates a pressure threshold ($P_{th}$) to said threshold thickness ($D_{th}$).

16. A magnetic transduction sensor device, of the type comprising at least one magnetic layer configured to determine a variable magnetisation (MF) in response to the variation of a physical quantity (P, T), wherein said device comprises a plurality of layers arranged in a stack, said magnetic layer configured to determine a variable magnetisation (MF), in response to the variation of a physical quantity (P, T) interacting magnetically through said variable magnetisation (MF) with a free magnetic layer, able to be associated with a temporary magnetisation (MT), said free magnetic layer belonging to said plurality of layers, which further comprises at least one spacer layer and a permanent magnetic layer associated to a permanent magnetisation (MP), wherein said physical quantity (P, T) is a temperature (T), and wherein said magnetic layer configured to determine a variable magnetisation (MF) in response to the variation in temperature (T) is a layer with low Curie temperature (Tc).

17. Device as claimed in claim 16, wherein said magnetic layer configured to determine a variable magnetisation (MF) in response to the variation in temperature (T) is laid over the free magnetic layer.

18. Device as claimed in claim 16, wherein it comprises a permanent magnetic layer with low saturation deposited over said magnetic layer configured to determine a variable magnetisation (MF) in response to the variation in temperature (T).

19. Device as claimed in claim 18, wherein it comprises a second spacer layer to separate the free magnetic layer from said magnetic layer configured to determine a variable magnetisation (MF) in response to the temperature variation (T).

20. Device as claimed in claim 16, wherein it comprises a third spacer layer to separate said permanent magnetic layer with low saturation from said magnetic layer configured to determine a variable magnetisation (MF) in response to the temperature variation (T).

21. Device as claimed in claim 16, wherein said permanent magnetic layer with low saturation and/or said magnetic layer configured to determine a variable magnetisation (MF) in response to the temperature variation (T) are obtained by means of a composite structure comprising magnetic particles contained in a matrix.

22. Device as claimed in claim 16, wherein said plurality of layers arranged in a stack configures a spin valve magnetic device.

23. A process for manufacturing a temperature sensor device as claimed in claim 16, wherein it provides for depositing a permanent magnetic layer with low saturation and/or said magnetic layer configured to determine a variable magnetisation (MF) in response to the temperature variation (T) through a thin film plating process, in particular a process of thermal evaporation and/or electro-plating in Galvanic cell and/or casting and/or spinning.

24. Process as claimed in claim 23, wherein said thin film plating process comprises, relatively to said magnetic layer able to vary a magnetisation associated therewith in response to a temperature (T) the plating of a composite structure of magnetic particles in a matrix and to adjust the composition of said composite structure as a function of the Curie temperature (Tc) to be obtained.

25. Detection process of a physical quantity by magnetic transduction, employing the device as claimed in claim 16.

26. Detection process of a physical quantity as claimed in claim 16, wherein said physical quantity is a temperature and in that the method comprises the following operations:

providing a layer with low Curie temperature;

associating said layer with low Curie temperature to a spin valve device in such a configuration that a magnetisation (MF) associated with the ferromagnetic state of said layer with low Curie temperature influences a temporary magnetisation (MT) associated to the free magnetic layer of said spin valve;

forcing an electrical current (I) in said sensor device;

measuring the value of the electrical resistance of said sensor device as a function of the values assumed by the pressure (T).

27. Method as claimed in claim 26, wherein it provides a permanent magnetic layer with low saturation able to induce magnetisation (MF) in the layer when said magnetisation (MF) is lost as a result of a transition above the Curie temperature (To).

28. A magnetic transduction sensor device, of the type comprising at least one magnetic layer configured to determine a variable magnetisation (MF) in response to the variation of a physical quantity (P, T), wherein said device comprises a plurality of layers arranged in a stack, said magnetic layer configured to determine a variable magnetisation (MF), in response to the variation of a physical quantity (P, T) interacting magnetically through said variable magnetisation (MF) with a free magnetic layer, able to be associated with a temporary magnetisation (MT), said free magnetic layer belonging to said plurality of layers, which further comprises at least one spacer layer and a permanent magnetic layer associated to a permanent magnetisation (MP), wherein said physical quantity (P, T) is a pressure (P) and in that said sensor device further comprises a compressible layer and in that said magnetic layer configured to determine a variable magnetisation (M) in response to the variation of a physical quantity (P, T) comprises a layer with high magnetic coercivity, said compressible layer and layer with high magnetic coercivity being associated with said plurality of layer, wherein said compressible layer is laid onto the free magnetic layer and said layer with high magnetic coercivity is laid onto said compressible layer (21), wherein said compressible layer has such an uncompressed thickness (D) as to prevent the layer with high magnetic coercivity from switching the temporary magnetisation (MT) associated with said free magnetic layer, wherein said layer with high magnetic coercivity is obtained by means of a composite structure comprising magnetic particles contained in a resilient matrix, and wherein said layer with high coercivity contains the compressible layer which is in the form of gel or foam or liquid.

29. Device as claimed in claim 28, wherein said plurality of layers comprises a substrate, in turn comprising a recess into which said sensor device is laid.

30. Device as claimed in claim 28, wherein said layer with high magnetic coercivity comprising magnetic particles contained in a resilient matrix is able to perform also the function of compressible layer.

31. Device as claimed in claim 28, wherein the compressible layer is obtained by means of a porous composite material.

32. Device as claimed in claim 28, wherein said plurality of layers arranged in a stack configures a spin valve magnetic device.

33. Device as claimed in claim 28, wherein it is associated to a pressure monitoring and/or restoring system of a tyre positioned on a wheel, said system comprising a control unit and one or more actuators for blowing air into the tyre.

34. Manufacturing process of a pressure sensor device as claimed in claim 28, wherein it provides for depositing said compressible layer by means of a spinning process and/or by means of a casting process and/or by evaporation.

35. Manufacturing process as claimed in claim 34, wherein it provides for depositing said magnetic layer with high coercivity by means of evaporation and/or electroplating techniques with electrochemical cell.

36. Detection process of a physical quantity by magnetic transduction, employing the device as claimed in claim 28.

37. Detection process as claimed in claim 36, wherein said physical quantity is a pressure (P) and in that the method comprises the following operations:
realising said compressible layer with an uncompressed thickness (D) exceeding a threshold thickness (Dth) below which the layer with high coercivity influences the magnetisation (MT) of the free magnetic layer;
forcing an electrical current (I) in said sensor device;
measuring the value of the electrical resistance of said sensor device as a function of the values assumed by the pressure (P).

38. Process as claimed in claim 37, wherein it associates a pressure threshold ($P_{th}$) to said threshold thickness ($D_{th}$).

39. A magnetic transduction sensor device, of the type comprising at least one magnetic layer configured to determine a variable magnetisation (MF) in response to the variation of a physical quantity (P, T), wherein said device comprises a plurality of layers arranged in a stack, said magnetic layer configured to determine a variable magnetisation (MF), in response to the variation of a physical quantity (P, T) interacting magnetically through said variable magnetisation (MF) with a free magnetic layer, able to be associated with a temporary magnetisation (MT), said free magnetic layer belonging to said plurality of layers, which further comprises at least one spacer layer and a permanent magnetic layer associated to a permanent magnetisation (MP),
wherein said physical quantity (P, T) is a temperature (T), and
wherein said permanent magnetic layer with low saturation and/or said magnetic layer configured to determine a variable magnetisation (MF) in response to the temperature variation (T) are obtained by means of a composite structure comprising magnetic particles contained in a matrix.

40. Device as claimed in claim 39, wherein said magnetic layer configured to determine a variable magnetisation (MF) in response to the variation in temperature (T) is laid over the free magnetic layer.

41. Device as claimed in claim 40, wherein said magnetic layer configured to determine a variable magnetisation (MF) in response to the variation in temperature (T) is a layer with low Curie temperature (Tc).

42. Device as claimed in claim 41, wherein it comprises a permanent magnetic layer with low saturation deposited over said magnetic layer configured to determine a variable magnetisation (MF) in response to the variation in temperature (T).

43. Device as claimed in claim 42, wherein it comprises a second spacer layer to separate the free magnetic layer from said magnetic layer configured to determine a variable magnetisation (MF) in response to the temperature variation (T).

44. Device as claimed in claim 41, wherein it comprises a third spacer layer to separate said permanent magnetic layer with low saturation from said magnetic layer configured to determine a variable magnetisation (MF) in response to the temperature variation (T).

45. Device as claimed in claim 39, wherein said plurality of layers arranged in a stack configures a spin valve magnetic device.

46. A process for manufacturing a temperature sensor device as claimed in claim 39, wherein it provides for depositing a permanent magnetic layer with low saturation and/or said magnetic layer configured to determine a variable magnetisation (MF) in response to the temperature variation (T) through a thin film plating process, in particular a process of thermal evaporation and/or electro-plating in Galvanic cell and/or casting and/or spinning.

47. Process as claimed in claim 46, wherein said thin film plating process comprises, relatively to said magnetic layer able to vary a magnetisation associated therewith in response to a temperature (T) the plating of a composite structure of magnetic particles in a matrix and to adjust the composition of said composite structure as a function of the Curie temperature (Tc) to be obtained.

48. Detection process of a physical quantity by magnetic transduction, employing the device as claimed in claim 39.

49. Detection process of a physical quantity as claimed in claim 48, wherein said physical quantity is a temperature and in that the method comprises the following operations:
providing a layer with low Curie temperature;
associating said layer with low Curie temperature to a spin valve device in such a configuration that a magnetisation (MF) associated with the ferromagnetic state of said layer with low Curie temperature influences a temporary magnetisation (MT) associated to the free magnetic layer of said spin valve;
forcing an electrical current (I) in said sensor device
measuring the value of the electrical resistance of said sensor device as a function of the values assumed by the pressure (T).

50. Method as claimed in claim 49, wherein if provides a permanent magnetic layer with low saturation able to induce magnetisation (MF) in the layer when said magnetisation (MF) is lost as a result of a transition above the Curie temperature (To).

* * * * *